(12) United States Patent
Kumar et al.

(10) Patent No.: US 12,155,659 B2
(45) Date of Patent: Nov. 26, 2024

(54) TOKEN BASED IDENTITY VERIFICATION AND CONSENT MANAGEMENT

(71) Applicant: T-Mobile Innovations LLC, Overland Park, KS (US)

(72) Inventors: Himanshu Kumar, Atlanta, GA (US); Tanmaya Gaur, Seattle, WA (US); Rahul Anant Padhye, Sammamish, WA (US); Stephen Milligan, Blaine, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 274 days.

(21) Appl. No.: 17/805,173

(22) Filed: Jun. 2, 2022

(65) Prior Publication Data

US 2023/0396618 A1   Dec. 7, 2023

(51) Int. Cl.
*H04L 9/40* (2022.01)

(52) U.S. Cl.
CPC ...... *H04L 63/0884* (2013.01); *H04L 63/0853* (2013.01); *H04L 63/102* (2013.01); *H04L 63/105* (2013.01)

(58) Field of Classification Search
CPC ............. H04L 63/0884; H04L 63/0853; H04L 63/102; H04L 63/105
USPC .......................................................... 726/4
See application file for complete search history.

(56) References Cited

U.S. PATENT DOCUMENTS

| | | | |
|---|---|---|---|
| 11,824,856 B1 * | 11/2023 | Sharma | H04L 9/3213 |
| 2015/0088756 A1 * | 3/2015 | Makhotin | G06Q 20/12 |
| | | | 705/71 |
| 2017/0104589 A1 * | 4/2017 | Lambert | H04L 9/3268 |
| 2019/0108326 A1 * | 4/2019 | Fujimaki | G06F 21/6218 |
| 2020/0076791 A1 * | 3/2020 | Kishimoto | H04L 9/0825 |
| 2020/0136825 A1 * | 4/2020 | Gupta | H04L 41/0895 |
| 2020/0259652 A1 * | 8/2020 | Schmaltz, III | H04L 9/30 |
| 2020/0336310 A1 * | 10/2020 | Jain | H04L 63/105 |
| 2021/0081565 A1 * | 3/2021 | Sakamoto | G06F 21/6245 |
| 2021/0250355 A1 * | 8/2021 | Galdo | G06F 21/335 |

(Continued)

OTHER PUBLICATIONS

Jones, Michael B. et al., "RFC 8693 OAuth 2.0 Token Exchange," Internet Engineering Task Force (IETF), Jan. 2020, <https://datatracker.ietf.org/doc/html/rfc8693>, 27 pages.

*Primary Examiner* — Thanh T Le

(74) *Attorney, Agent, or Firm* — Shook, Hardy & Bacon L.L.P.

(57) ABSTRACT

System and methods for token based identity verification and consent management are provided. In one embodiment, a method for identity (ID) verification and consent management for on-behalf-of transactions comprises: receiving an authorization request for a principal user from a first user equipment (UE); generating a consent token for the principal user based on authentication information in the authorization request; adding the consent token to an authenticated user queue, wherein the authenticated user queue associates the consent token to the principal user; receiving a message from a second UE indicating a selection of the principal user; and initiate sending of the consent token from the authenticated user queue to the first UE in response to the selection. In some embodiments, the consent token indicates a permission level granted to the agent user for accessing a data profile associated with the principal user.

20 Claims, 9 Drawing Sheets

(56) References Cited

U.S. PATENT DOCUMENTS

| | | | |
|---|---|---|---|
| 2021/0266306 A1* | 8/2021 | Furman | H04L 63/205 |
| 2022/0131685 A1* | 4/2022 | Lim | H04L 9/3268 |
| 2022/0171832 A1* | 6/2022 | Gallagher | H04L 9/0866 |
| 2022/0300979 A1* | 9/2022 | Mudumbai Srinivasa | G06K 7/10782 |

* cited by examiner

TOKEN BASED IDENTITY VERIFICATION AND CONSENT MANAGEMENT

BACKGROUND

On-Behalf-Of (OBO) authentication is a technology used today that allows a software application to perform one or more tasks as an authorized agent of an authenticated user. For example, a user may authenticate themselves with an identity verification system. The identity verification system, in response, produces a token than when presented to another application or network service, delegates an access grant to the user. The identity verification system thus acts as an agent of the user, by issuing the token on behalf of the user, to log the user into the other application or network service.

However, there are situations that occur where the user is not the person who needs direct access to the application. Instead, a secondary user may need to interact with the application on behalf of the user. For example, a customer of a company may need to receive, or make transaction with, data securely stored by the company in a user account profile. That user (the customer), however, may not have direct access to the company's network or computing systems to access that user account profile, and instead will need to work through a company service representative to perform the desired transactions. The customer calling in to talk with the service representative may be expected to provide details that prove their identity to the service representative. The service representative would then need to authenticate themselves to gain access to the company's system and the user data profile. A problem with this arrangement is that there currently is no mechanism in the process to ensure that the service representative actually has authorization from the customer to access the user account data on the company system. Moreover, there is no mechanism to ensure that the level of access made available to the service representative is commensurate with the scope of access understood and/or authorized by the customer. In other words, the customer may only intend the service representative to have access to a specific subset of the user data profile needed to resolve a current issue, and not have access to the entirety of data associated with the user's account profile.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present disclosure is directed, in part, to token based identity verification and consent management, substantially as shown and/or described in connection with at least one of the Figures, and as set forth more completely in the claims. In some embodiments, solutions are provided that address the problem of securing the consent of a principal user to authorize an agent to access data and/or act on behalf of the principal user. Current technology lacks mechanisms that ensure an agent actually has authorization from the principal user and mechanisms to limit the access to the user's data to be commensurate with a scope of access understood and/or specifically authorized by the principal user.

Embodiments of the present disclosure provide a token based consent mechanism that permits a principal user to grant limited access to personal data stored on a data server to an agent that will act on behalf of the principal user. In some embodiments, the principal user may authenticate themselves to a hybrid identity (ID) consent manager. Once the principal user is authenticated, the hybrid ID consent manager generates a signed consent token that captures, for example, the principal user's identity and further indicates a permission level to be granted to the agent. The consent token may be stored in a queue until the agent is ready to assist the principal user. When the agent is ready to assist the principal user, the consent token is then sent to a user equipment of the principal user (e.g., by SMS, email, or to a client application). The principal user may then presents the consent token to the agent, by verbally repeating a code, visually presenting a code (such as a QR code, for example), or by sending the consent token to user equipment of the agent electronically. An operating token comprising the consent token, and the agents own credentials, are provided to a data server to grant the agent access to the principal user's data. The data server may limit the agent's access to records that pertain to the principal user identified by the consent token, and to only provide access to data that is accessible at the permission level confirmed by the consent token. In some embodiments, a first agent may handoff the consent token to user equipment of a second agent. The second agent then may take over as agent to act on behalf of the principal user as permitted by the consent token.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Embodiments of the present disclosure provide a token based consent mechanism that permits a first user (referred to herein as a principal user, or principal) to grant limited access to a system to a second user (referred to herein as an agent user, or agent) to act on behalf of the first user. That is, the present disclosure provides embodiments that, among other things, provide for authentication of a principal user and confirmation of the principal user's consent when an agent acts on behalf of the principal user to access the principal user's data, or otherwise access services to act on behalf of the principal user. In some embodiments, once the principal user is authenticated, a consent token is created that captures, for example, the principal user's identity and a permission level (e.g., an access level) to be granted to the agent. The consent token may be stored in a queue until the agent is ready to assist the principal user. When the agent indicates they are ready to assist the principal user, the consent token is then sent to the principal user (e.g., by SMS, email, or to a client application), and the principal user presents the token to the agent, by verbally repeating a code, visually presenting a code (such as a QR code, for example), or by sending an electronic acknowledgement, for example. The agent may then provide the consent token, together with their own credentials (e.g., in an operating token) to a data server to access the principal user's data. In some embodiments, the data server may limit the agent's access, for example, to: 1) data pertaining to the principal user identified by the consent token, and 2) only data that is accessible at the permission level confirmed by the consent token. In some embodiments, a first agent may "handoff" the consent token to a second agent who then takes over as agent to act on behalf of the principal user.

Figure 1:
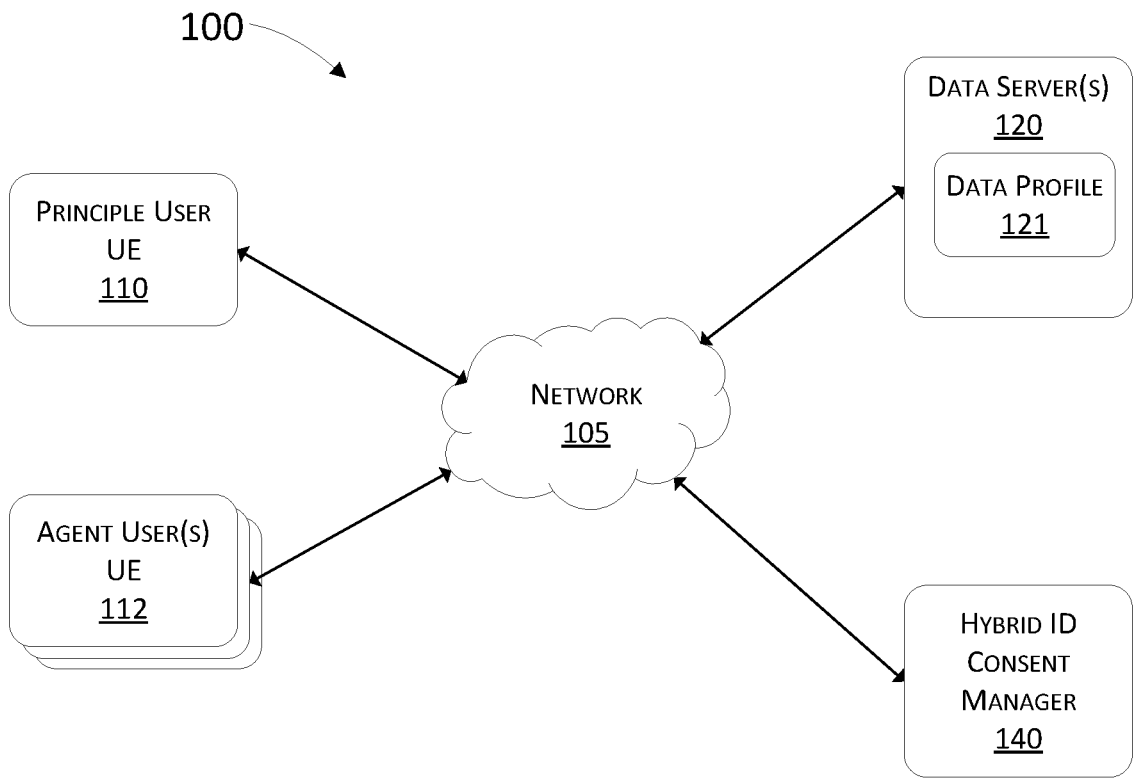
FIG. 1 is a diagram illustrating an example operating environment for a hybrid identity (ID) consent manager, in accordance with one embodiment.

FIG. 1 is a diagram illustrating an example operating environment 100, in accordance with some embodiments described herein. As shown in FIG. 1, operating environment 100 comprises a principal user equipment (UE) 110, at least one agent UE 112, a hybrid identity (ID) consent manager 140, and at least one data server 120. The principal user UE 110 and agent user UE 112 may comprise any form of computing device comprising such as, but not limited to, workstations, desktop computers, laptop computers, smart phones, tablets, handheld and/or wearable computing devices, personal digital assistants, a fitness tracker, or any other device capable of communicating using one or more resources of the network 105.

The terms "user equipment," "UE," and/or "user device" are used interchangeably to refer to a device employed by an end-user that communicates using a network. UE 110 and UE 112 may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G. In some embodiments, the processor may be programmed to execute code to implement one or more of the functions of the UE 110 and UE 112 described herein.

Each of the principal user UE 110 and agent user UE 112 may comprise a wired or wireless network interface though which they communicate via the network 105. The at least one network 105 may include any form or combination of wired or wireless communication networks including, but not limited to, a cellular communications network and/or the Internet. The data server 120 may execute at least one service that includes a data profile 121 associated with the principal user. As the term is user herein, a "data profile", "user profile", or "profile data", may comprise an account, ledger, a database and/or other data store having personal, financial, medical, educational or other records and/or histories associated with the principal user. Access to the data profile 121 on data server 120 is secured such that the principal user does not directly interface with the data server 120, but instead works through an agent operating the agent UE 112 in order to access, update, or otherwise perform transactions with the data in the data profile 121 on data server 120.

For one or more of the embodiments described herein, the principal user and agent each operate through their respective UEs (110, 112) to interact with the hybrid ID consent manager 140. The hybrid ID consent manager 140 generates the consent token that evidences the principal user's agreement to grant the agent (at a designated permission level) access to the principal user's data profile 121 on the data server 120, and provides the agent user with a mechanism with which they can gain access to that specific data profile 121 on the data server 120 at the designated access level. As explained herein, the hybrid ID consent manager 140 executes a consent validation process in which both parties (that is, the principal user and the agent) have a role.

Figure 2:
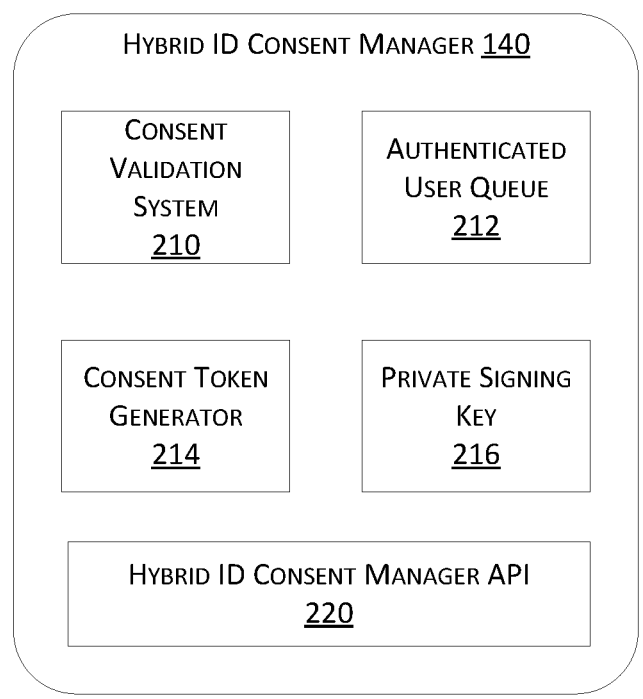
FIG. 2 is a diagram illustrating a hybrid ID consent manager, in accordance with one embodiment.
Figure 8:
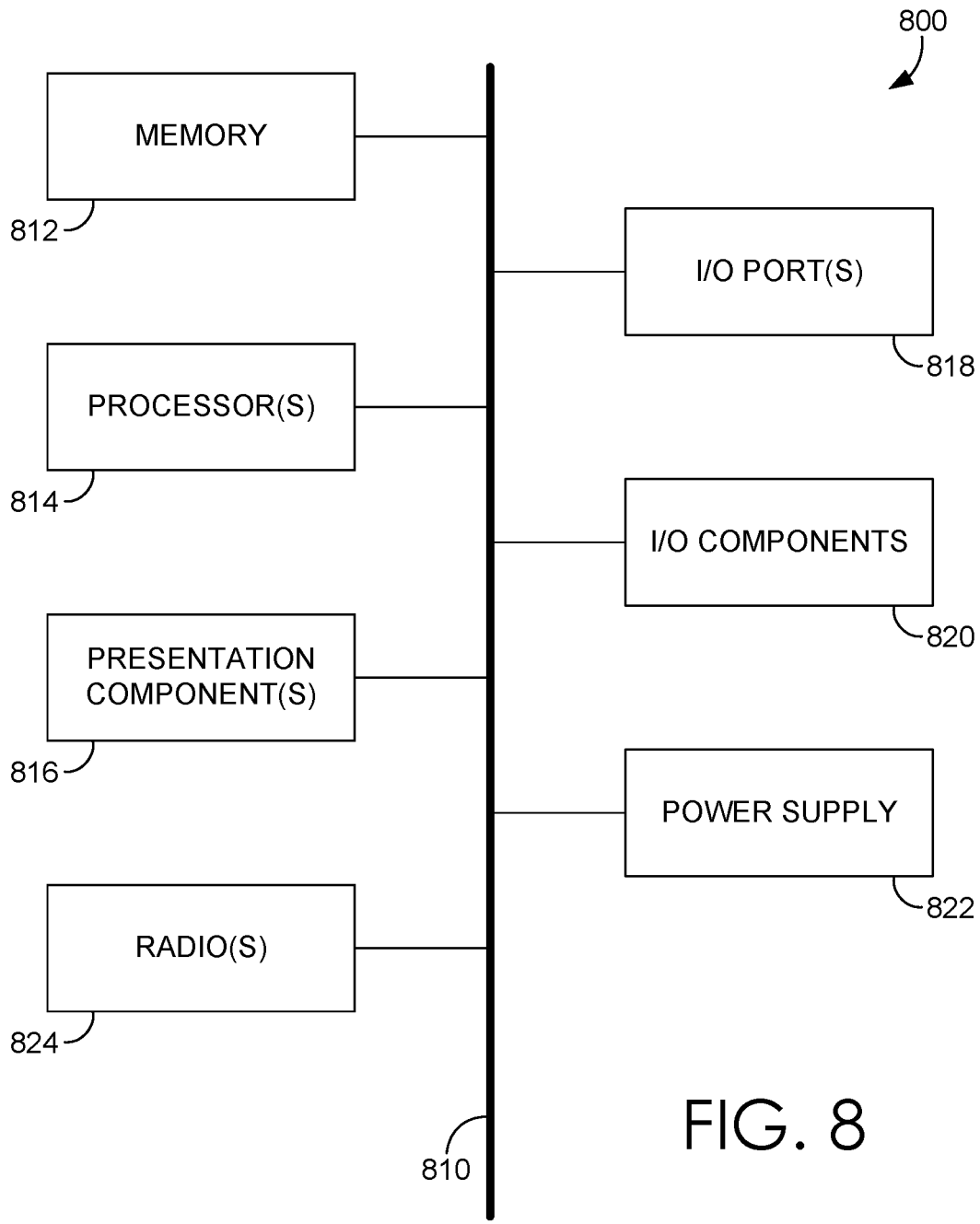
FIG. 8 is a diagram illustrating an example computing environment, in accordance with one embodiment.
Figure 9:
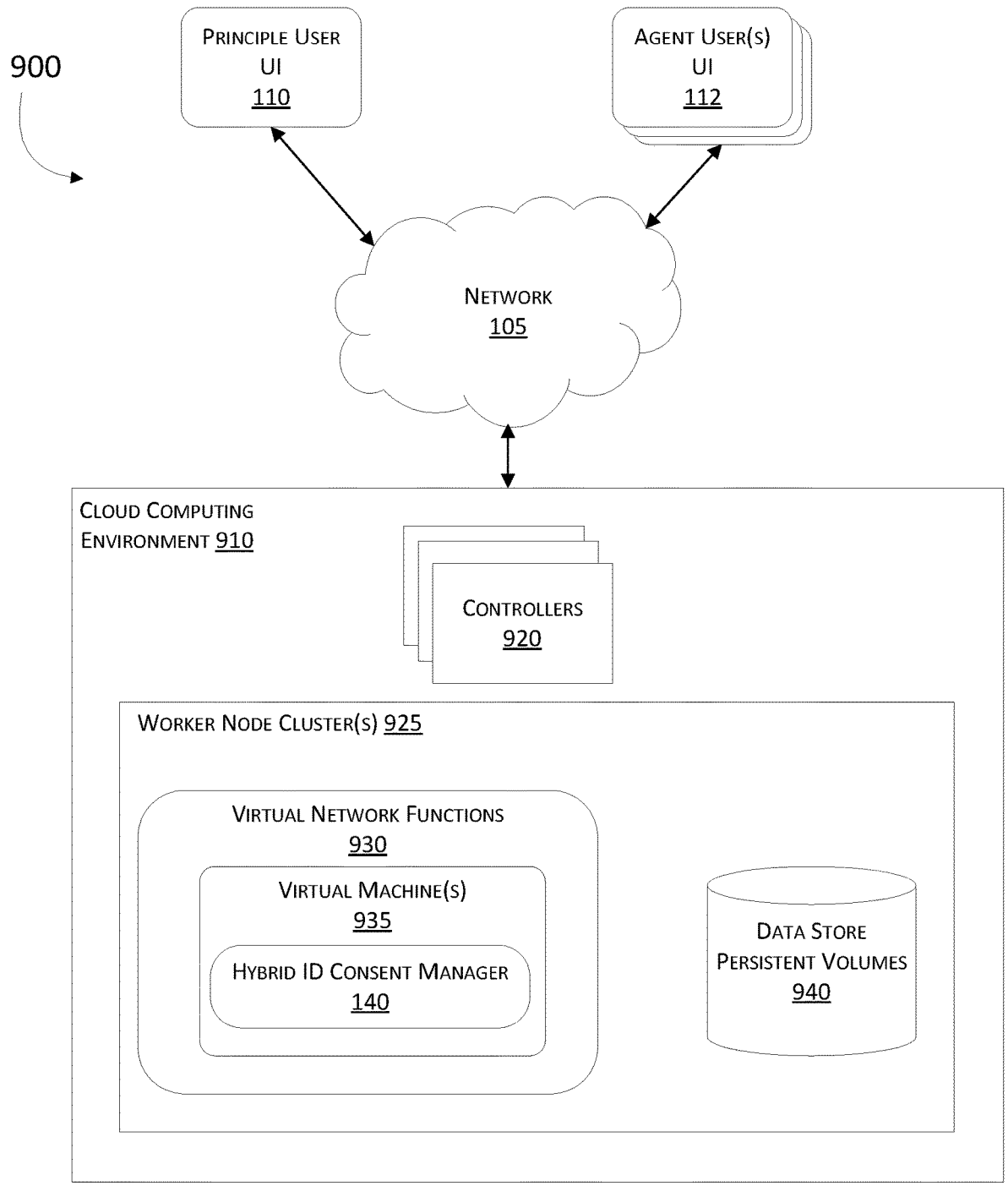
FIG. 9 is a diagram illustrating an example cloud computing environment, in accordance with one embodiment.

FIG. 2 is a diagram illustrating an example embodiment of a hybrid ID consent manager 140. In the embodiment shown in FIG. 2, the hybrid ID consent manager 140 comprises a consent validation system 210, an authenticated user queue 212, a consent token generator 214, a private signing key 216 and a hybrid ID consent manager API (Application Programmable Interface) 220. The hybrid ID consent manager 140 may be implemented on a computing device 800 (as shown in FIG. 8) or cloud computing environment 910 (as shown in FIG. 9) programmed to execute code to carry out the various functions and elements of the hybrid ID consent manager 140 described herein. In some embodiments, the functions of the hybrid ID consent manager 140 are distributed across more than one computing system.

As previously discussed, the principal user and agent each interact with the hybrid ID consent manager 140 to generate and utilize a consent token. For example, in one embodiment in operation, the principal user may interact via the principal user UE 110 to instruct the hybrid ID consent manager 140 to initiate user authentication and generate the consent token. The principal user UE 110 may communicate with the consent validation system 210 of hybrid ID consent manager 140 through the hybrid ID consent manager API 220. The UE 110 obtains user authentication credentials for the principal user (such as by prompting the principal user for a user name and password, for example) and may also receive from the principal user an indication of the type of transaction the principal user wants to initiate (which may indicate the permission level that the agent is to be granted). The consent validation system 210, upon verifying the principal user authentication credentials, instructs the consent token generator 214 to produce the consent token, which is signed using the private signing key 216 for the hybrid ID consent manager 140. The signed consent token is then placed into the authenticated user queue 212 until such time as the agent user is ready to serve the principal user. When ready, the agent user, via their UE 112 and the hybrid ID consent manager API 220, accesses the authenticated user queue 212. The authenticated user queue 212 may store consent tokens for multiple principal users awaiting service. When the agent user selects the principal user from the authenticated user queue 212, the consent token for that principal user is transmitted to the principal user UE 110, and the principal may then present the consent token to the agent user.

In some embodiments, for the agent user to gain access to the principal user's profile on the data server 120, the agent user UE 112 may incorporate the consent token into an operating token together with the agent's own credentials, to allow the agent to gain access to the principal user's data profile 121 on the data server 120 in order to perform transactions on behalf of the principal user. The data server 120 may grant the agent user access, but limit that access to the data profile 121 associated with the principal user identified by the consent token. The data server 120 may also limit the agent to performing transactions and/or accessing data sets corresponding to the permission level identified by the consent token. In some embodiments, such access will be granted by the data server 120 based on the data server 120 successfully validating that the consent token is signed using a consent token signature from a recognized authority, and that the consent token has not become corrupted or tampered with based on the consent token signature. Otherwise, if the consent token signature cannot be validated or the consent token appears to be corrupt or tampered with, the user agent's access request is rejected by the data server 120.

Figure 3:
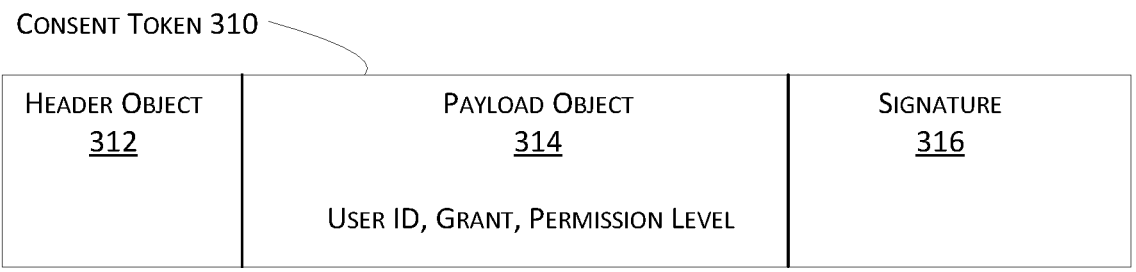
FIG. 3 is an example consent token, in accordance with one embodiment.

FIG. 3 is a diagram illustrating an example consent token 310 according to one embodiment. Consent token 310 may be structured as a string object and include a header object 312, a payload object 314 and a consent token signature 316. In some embodiments, the consent token 310 is generated based on standard Open ID Connect (OIDC) protocols and may comprise a JavaScript Object Notation (JSON) object or JSON web token (JWT). Accordingly, the consent token signature 316 may comprise a JSON Object signature and encryption (JOSE) signature. The header object 312 may carry information about the type of data included in the consent token 310 and describe the cryptographic operations applied to the consent token 310, such as any signing and/or decryption techniques used by the consent token 310. The payload object 314 carries pertinent data used to grant the agent access to the user's data profile 121 on the data server 120, including one or more of, for example, a User ID of the principal user, a grant (information explicitly indicating authorization to access the data profile associated with the User ID), and/or a permission level (indicating what subset of the data profile the agent may access and/or what transactions the agent may conduct on behalf of the principal user). Consent token signature 316 comprises a signature generated based on the contents of the payload object 314 and the private signing key 216, and is used by the data server 120 to verify the authenticity of the consent token 310, and verify the integrity of the payload object 314 (e.g., that it has not been altered since generation by the consent token generator 214). Because the consent token 310 is generated in response to an authenticated request from the principal user, receipt of the consent token 310 by the data server 120 provides confirmation to the data server 120 that the principal user has authorized the agent to perform one or more of a limited scope of transactions on behalf of the principal user. In some embodiments, after the agent completes a transactional session with the data server 120, the consent token 310 becomes void. The consent token 310 may also become void after a configurable duration of time has elapsed since it was generated and/or retrieved from the authenticated user queue 212.

Figure 4:
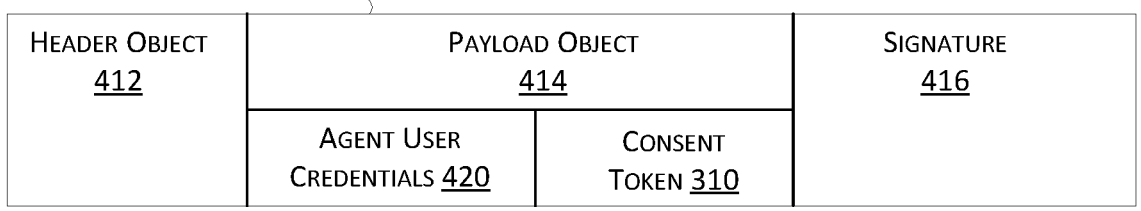
FIG. 4 is an example operating token, in accordance with one embodiment.

FIG. 4 is a diagram illustrating an example operating token 410 according to one embodiment. In some embodiments, the operating token 410 comprises the agent's credentials and indicates the agent's authorization to access the data server 120. Operating token 410 may be structured as a string object and include a header object 412, a payload object 414 and an operating token signature 416, that have the same properties as the header object 312, payload object 314 and consent token signature 316 of consent token 310. One difference between the consent token 310 and the operating token 410 is that the payload object 414 carries the combination of the consent token 310 and agent user credentials 420 from the agent UE 112 to the data server 120. In some embodiments, the agent user credentials 420 may themselves be in the form of a token.

In some embodiments, when the data server 120 receives the operating token 410, the integrity and authenticity of the operating token 410 are verified based on the operating token signature 416, and the consent token 310 and agent user credentials 420 are extracted from the payload object 414. The agent is authenticated for accessing the data server 120 based on the agent user credentials 420. The data profile and permission level they are granted access to by data server 120 is determined based on the payload object 314 of the consent token 310. In some embodiments, after the agent completes a transactional session with the data server 120, the operating token 410 becomes void. The operating token 410 may also become void after a configurable duration of time has elapsed since the consent token 310 was generated and/or retrieved from the authenticated user queue 212.

Figure 5:
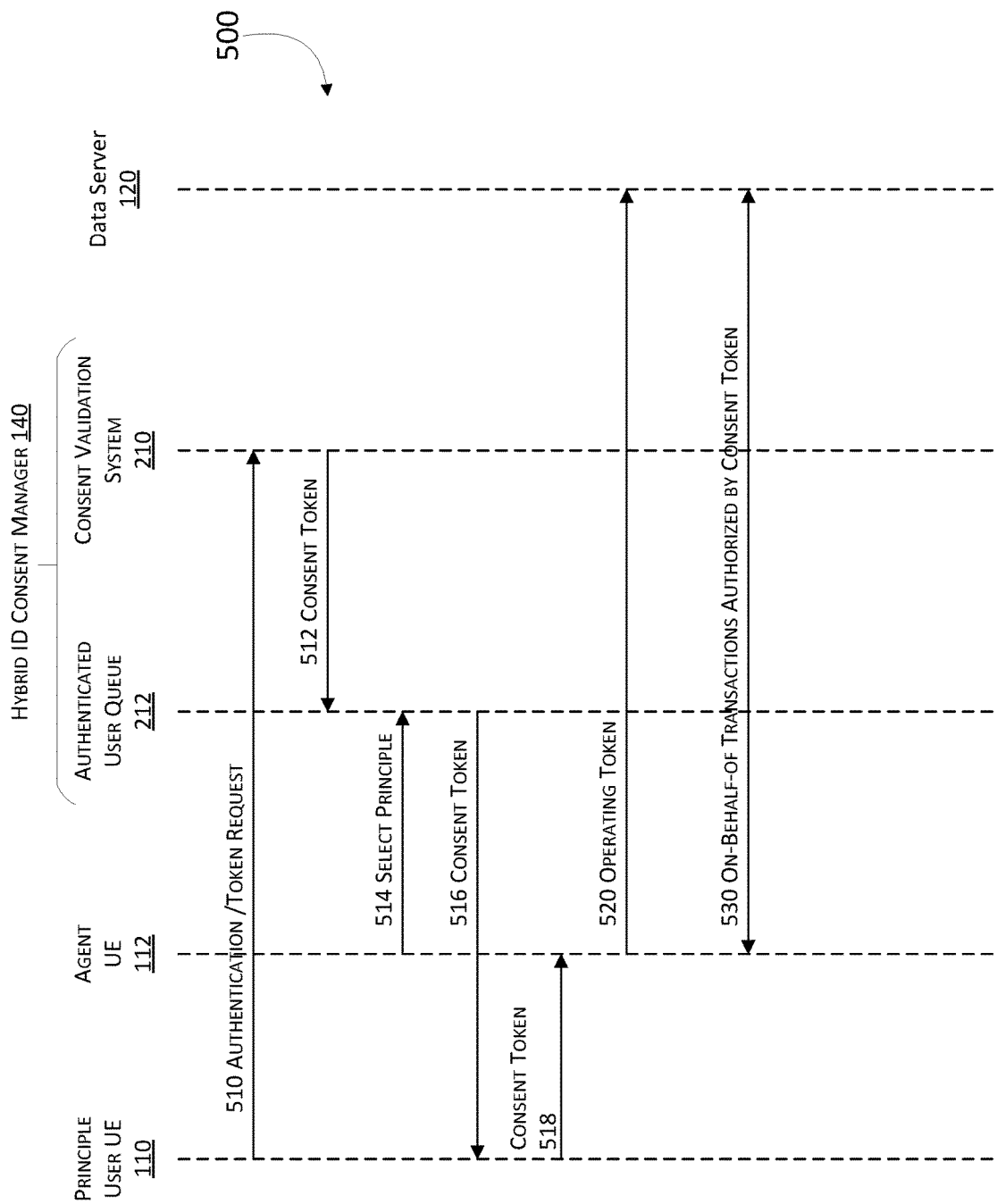
FIG. 5 is message flow diagram illustrating example interactions between a principal user, an agent, and a hybrid ID consent manager to initiate transactions with a data server, in accordance with one embodiment.

FIG. 5 is a message flow diagram 500 illustrating interactions between the principal user UE 110, agent UE 112, Hybrid ID consent manager 140, and the data server 120, to initiate transactions by an agent on behalf of a principal user. The principal user UE 110, in response to inputs received from the principal user, transmits an authorization request message 510 to the consent validation system 210. Given a valid authentication by the principal user, within the hybrid ID consent manager 140 the consent token generator 214 produces a consent token 512 (signed by the private signing key 216) and adds the consent token 512 to the authenticated user queue 212. When the agent is ready to serve the principal user, they use the agent UE 112 to send a message to select the principal user from the authenticated user queue 212 (shown at 514). In response, the hybrid ID consent manager 140 transmits the consent token (shown at 516) to the principal user UE 110. The principal user then explicitly expresses their consent for the agent to act on their behalf by providing the consent token to the agent UE 112 (shown at 518). For example, in some embodiments the consent token may be received by the principal user UE 110 as a QR code or similar type code (in an email or SMS message, for example) which they provide to the agent to scan using the agent UE 112. Once the consent token is received at the agent UE 112, the agent UE 112 may transmit an operating token (as shown at 520) to the data server 120. As discussed above, the operating token may carry a combination of authentication credentials for the agent and the consent token. The agent is authenticated for accessing the data server 120 based on the agent user credentials. The data profile and permission level the agent is granted access to is determined by data server 120 based on the consent token 310. The agent may then perform one or more transactions with the data profile on behalf of the principal user as shown at 530.

Figure 6:
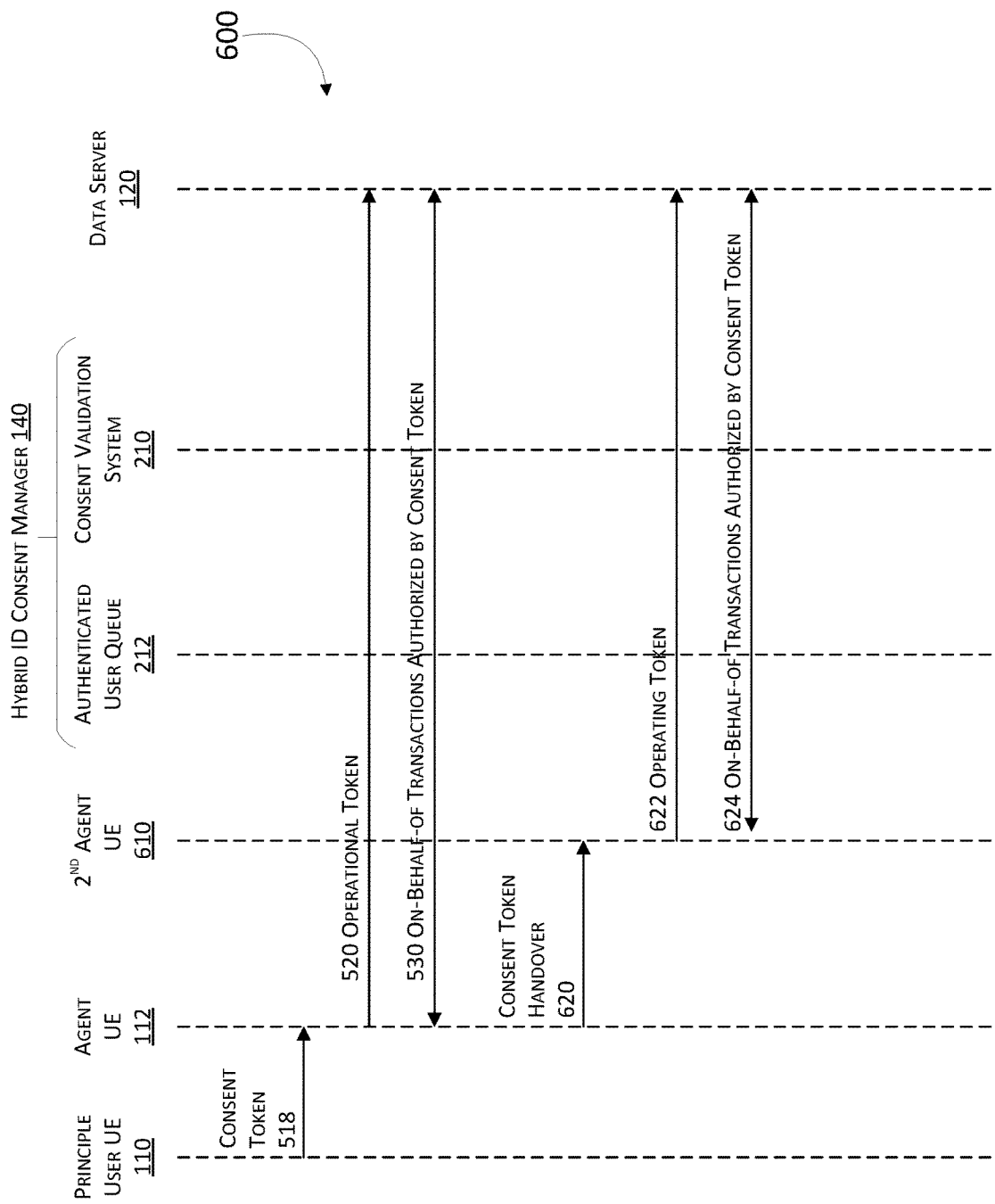
FIG. 6 is an example message flow diagram illustrating a consent token handover from a first agent to a second agent, in accordance with one embodiment.

As previously mentioned, there are use case scenarios where a need may arise for a second agent to take over from a first agent that initially received the consent token. In such scenarios, the first agent may perform a "handoff" of the consent token to the second agent who then takes over as agent to act on behalf of the principal user. FIG. 6 is a message flow diagram 600 illustrating an example interaction between the principal user UE 110, a first agent UE 112, a second agent UE 610, and the data server 120 to initiate a consent token handoff In the example of FIG. 6, the initial actions to grant the first agent access to the data server 120 has already been completed, such as described in FIG. 5, with the first agent providing the operating token to the data server 120 (shown at 520) and performing one or more transactions on behalf of the user (as shown at 530). In order to grant the second agent access to the principal user's data profile 121 on the data server 120, the consent token is transferred by the first agent from the first agent UE 112 to the second agent UE 610 through a consent token handover 620. Once the consent token is received at the second agent UE 610, the second agent UE 610 may send an operating token (as shown at 622) to the data server 120. The operating token 622 may carry the authentication credentials for the second agent together with the consent token. The second agent is authenticated for accessing the data server 120 based on the second agent's user credentials. The data profile and permission level the agent is granted access to by data server 120 is determined based on the consent token 310. The second agent may then perform one or more transaction on behalf of the user as shown at 624. In some embodiments, the operating token 622 may comprise a flag or other information indicating that the first agent has initiated a handover to the second agent so that the data server 120 does not formally close the session of transactions on behalf of the principal user or otherwise void the consent token when the first agent disconnects from the data server 120.

Figure 7:
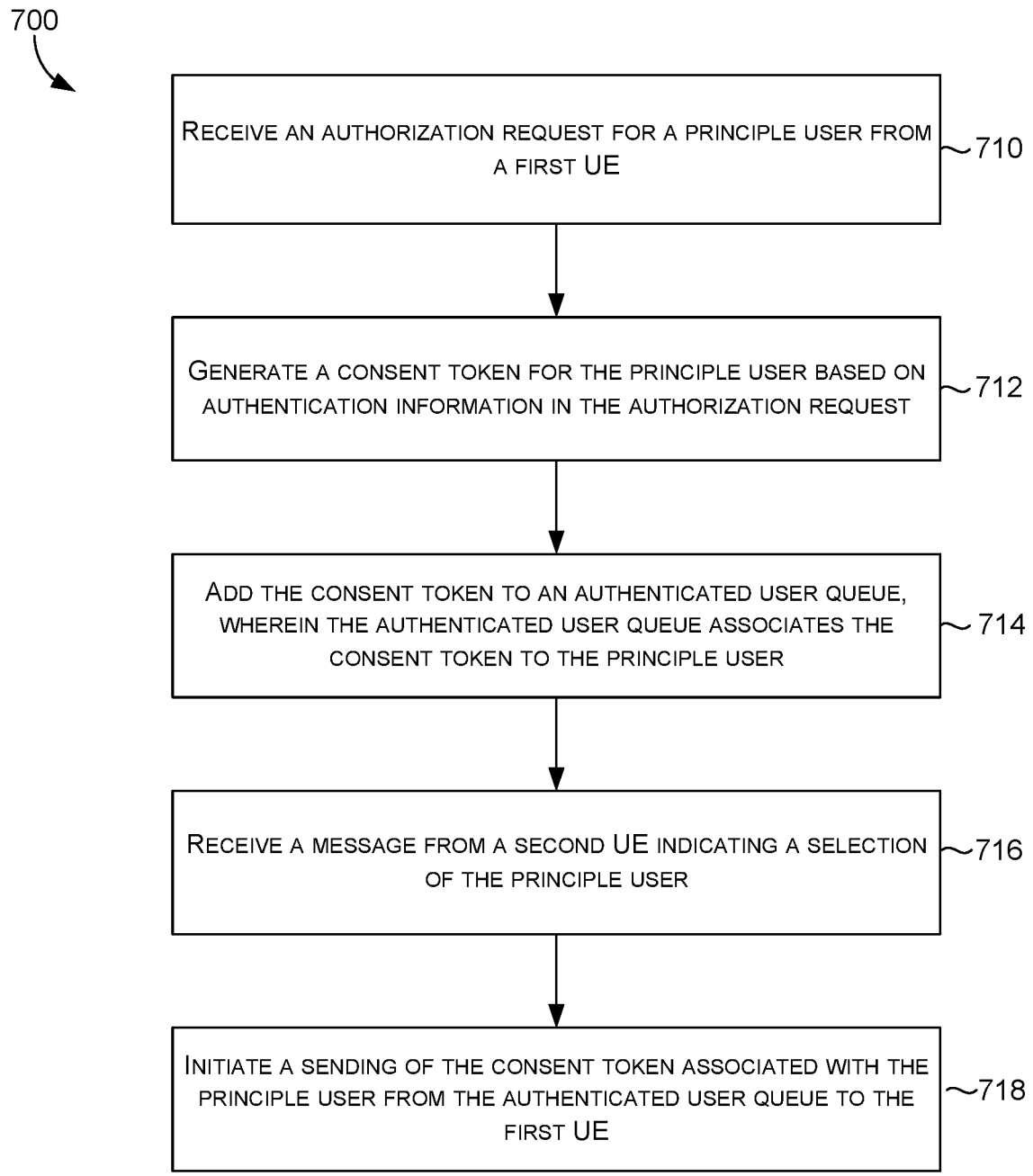
FIG. 7 is a flow chart illustrating an example token based method for authorizing an agent to perform transactions on behalf of transactions for a principal user, in accordance with one embodiment.

FIG. 7 is a flow chart illustrating a method 700 for authorizing an agent to perform transactions on behalf of transactions for a principal user, in accordance with one embodiment. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa. In some embodiments, elements of method 700 are implemented utilizing the hybrid ID consent manager 140 as discussed herein.

The method 700 includes at 710 receiving an authorization request for a principal user from a first UE. In some embodiments, a principal user, from a first UE, enters authentication credentials (such as a user name and password, for example), and the first UE transmits an authorization request message to the hybrid ID consent manager. The method 700 at 712 includes generating a consent token for the principal user based on authentication information in the authorization request. In some embodiments, upon verifying the validity of the principal user authentication credentials, a consent token generator produces a consent token that is signed using a private signing key for the hybrid ID consent manager. In some embodiments, the consent token may be formatted as a string object, and may be generator based on standard OIDC protocols and/or comprise a JSON object or JSON web token.

The method 700 at 714 includes adding the consent token to an authenticated user queue. Within the authenticated user queue the consent token is associated with the principal user. The signed consent token may be stored in the authenticated user queue until such time as an agent user is ready to serve the principal user. In some embodiments, when the agent user is ready, they may access the authenticated user queue via a second UE, and select the principal user. The authenticated user queue may store consent tokens for multiple principal users awaiting service such that the agent user selects the principal user from a listing of principal users. Accordingly, the method 700 at 716 includes receiving a message from a second UE indicating a selection of the principal user, and at 718 includes initiate sending of the consent token from the authenticated user queue to the first UE in response to the selection. When the agent user selects the principal user, the consent token associated with that principal user may be transmitted to the principal user's UE. The principal may then present the consent token to the agent user. Method 700 thus presents a consent validation process in which both the principal user and agent have a role in ensuring consent was granted for the agent to access the data profile on behalf of the principal user. For example, a consent token is generated when the principal user is authenticated. The principal user receives the consent token in response to the agent initiating the transfer of the consent token from the authenticated user queue to the principal user. The agent cannot access the data profile on behalf of the principal user until the principal user provides the agent with the consent token. Consent of the principal user to grant the agent permission to access the data profile on behalf of the principal user is captured by the receipt of the consent token from the principal user by the agent UE.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more busses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device." In some embodiments, the hybrid ID consent manager 140 as described in any of the examples of this disclosure, may be implemented at least in part by code executed by the one or more processors(s) 814 and in some embodiments, the authenticated user queue 212 implemented at least in part by memory 812.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 820. One or more presentation components 816 presents data indications to a person or other device. Exemplary one or more presentation components 816 include a display device, speaker, printing component, vibrating component, etc. I/O ports 818 allow computing device 800 to be logically coupled to other devices including I/O components 820, some of which may be built in computing device 800. Illustrative I/O components 820 include a microphone, joystick, game pad, satellite dish, scanner, printer, wireless device, etc.

Radio(s) 824 represents a radio that facilitates communication with a wireless telecommunications network. Illustrative wireless telecommunications technologies include CDMA, GPRS, TDMA, GSM, and the like. Radio 824 might additionally or alternatively facilitate other types of wireless communications including Wi-Fi, WiMAX, LTE, or other VoIP communications. As can be appreciated, in various embodiments, radio(s) 824 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Referring to FIG. 9, a diagram is depicted general at 900 of an exemplary cloud computing environment 910 for implementing one or more aspects of the hybrid ID consent manager 140. Cloud computing environment 910 is but one example of a suitable cloud computing environment and is not intended to suggest any limitation as to the scope of use or functionality of the embodiments presented herein. Neither should cloud computing environment 910 be interpreted as having any dependency or requirement relating to any one or combination of components illustrated.

Cloud computing environment 910 includes one or more controllers 920 comprising one or more processors and memory. The controllers 920 may comprise servers of a data center. In some embodiments, the controllers 920 are programmed to execute code to implement at least one or more aspects of the hybrid ID consent manager 140 and/or data server 120. In some embodiments, the controllers 920 establish a cloud computing platform executing at least one or more aspects of the hybrid ID consent manager 140 and/or data server 120.

For example, in one embodiment the hybrid ID consent manager 140 and/or data server 120 are virtualized network functions (VNFs) 930 running on a worker node cluster 925 established by the controllers 920. The cluster of worker nodes 925 may include one or more orchestrated Kubernetes (K8s) pods that realize one or more virtual machines 935 for the hybrid ID consent manager 140 and/or data server 120. In some embodiments, the principal user UE 110 and agent UE 112 may be coupled to the controllers 920 of the cloud computing environment 910 by network 105. In some embodiments, the data server 120 may be implemented at least in part as one or more data store persistent volumes 940 in the cloud computing environment 910, the data store persistent volumes 940 storing the data profile for which one or more agents access to perform transaction on behalf of a principal user, as described above.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for identity (ID) verification and consent management for on-behalf-of transactions, the system comprising:
   one or more processors; and
   one or more computer-readable media storing computer-usable instructions that, when executed by the one or more processors, cause the one or more processors to:
   generate a consent token for a principal user based on an authorization request message, the authorization request message comprising at least authentication credentials for the principal user;
   add the consent token to an authenticated user queue, wherein the consent token is associated with the principal user by the authenticated user queue; and
   initiate sending of the consent token to the principal user in response to receiving a message from an agent user indicating a selection of the principal user, wherein the consent token is provided from the authenticated user queue to a first user equipment (UE) of the principal user as a scannable code that when scanned by a second UE of the agent user generates an operating token to access one or more data servers on behalf of the principal user.

2. The system of claim 1, wherein the authorization request message is received from the first user equipment (UE), wherein the first UE transmits the authorization request message in response to an interaction from the principal user with the first UE; and
   wherein the message from the agent user indicating the selection of the principal user is received from the second UE.

3. The system of claim 1, wherein the consent token indicates a permission level granted to the agent user for accessing a data profile associated with the principal user.

4. The system of claim 1, wherein the one or more processors execute a hybrid ID consent manager comprising:
   a consent validation system; and
   a consent token generator;
   wherein the consent validation system receives and verifies the authentication credentials, and instructs the consent token generator to produce the consent token, wherein the consent token is signed using a signing key for the hybrid ID consent manager.

5. The system of claim 1, wherein the consent token comprises at least one of a string object, a JavaScript Object Notation (JSON) object, or a JSON web token (JWT).

6. The system of claim 1, wherein the one or more computer-readable media storing computer-usable instructions further cause the one or more processors to:
   generate the operating token for the agent user based on receiving the consent token from the principal user;
   transmit the operating token to one or more data servers; and
   perform one or more transactions associated with a data profile for the principal user based on input from the agent user and the operating token.

7. The system of claim 6, wherein the operating token comprises a payload that includes the consent token.

8. The system of claim 6, wherein the operating token comprises a payload that includes the consent token and authentication credentials for the agent user.

9. The system of claim 6, wherein the one or more computer-readable media storing computer-usable instructions further cause the one or more processors to:
   perform a consent token handover to a second agent user by transmitting the consent token from a first agent user equipment (UE) to a second agent UE;
   generate a second operating token for the second agent user based on receiving the consent token from the first agent UE;
   transmit the second operating token to the one or more data servers; and
   perform one or more transactions associated with the data profile for the principal user based on input from the second agent user and the second operating token.

10. A method for identity (ID) verification and consent management for on-behalf-of transactions, the method comprising:
    receiving an authorization request for a principal user from a first user equipment (UE);
    generating a consent token for the principal user based on authentication information in the authorization request;
    adding the consent token to an authenticated user queue, wherein the authenticated user queue associates the consent token to the principal user;
    receiving a message from a second UE indicating a selection of the principal user; and
    initiating sending of the consent token from the authenticated user queue to the first UE in response to the selection, wherein the consent token is provided from the authenticated user queue to the first UE as a scannable code that when scanned by the second UE generates an operating token to access one or more data servers on behalf of the principal user.

11. The method of claim 10, wherein the consent token indicates a permission level granted to an agent user for accessing a data profile associated with the principal user.

12. The method of claim 10, wherein the authentication information includes authentication credentials of the principal user, the method further comprising:
    in response to verifying the authentication credentials of the principal user, generating the consent token, wherein the consent token is signed using a signing key.

13. The method of claim 10, wherein the consent token comprises at least one of a string object, a JavaScript Object Notation (JSON) object, or a JSON web token (JWT).

14. The method of claim 10, further comprising:
    generating the operating token for an agent user in response to receiving the consent token from the principal user;
    transmitting the operating token to one or more data servers; and
    performing one or more transactions with the one or more data servers, the one or more transactions associated with a data profile for the principal user.

15. The method of claim 14, wherein the operating token comprises a payload that includes the consent token.

16. The method of claim 14, further comprising:
    performing a consent token handover by generating a second operating token for a second agent user in response receiving the consent token at a third UE;
    transmitting the second operating token to the one or more data servers; and performing one or more transactions associated with the data profile for the principal user based on input from the second agent user and the second operating token.

17. A method for identity (ID) verification and consent management for on-behalf-of transactions, the method comprising:

sending a message to cause an authenticated user queue to send a consent token to a principle user, wherein the consent token is authorized by the principle user;

receiving the consent token from the principal user, wherein the consent token is received as a scannable code;

generating an operating token for an agent user based on a scan of the scannable code, wherein the operating token includes the consent token;

transmitting the operating token to one or more data servers; and performing one or more transactions with the one or more data servers, the one or more transactions associated with a data profile associated with the principal user.

18. The method of claim 17, wherein the data profile includes information associated with the principal user comprising at least one of: account information, personal information, historical information, financial information, and medical information.

19. The method of claim 17, wherein the consent token comprises a permission level granted for accessing the data profile associated with the principal user.

20. The method of claim 17, wherein the operating token comprises a payload that includes the consent token and authentication credentials for the agent user to access the one or more data servers on behalf of the principal user.

* * * * *